Aug. 13, 1935.  O. K. HASELAU  2,011,147
SHAFT CONNECTING MECHANISM
Original Filed April 18, 1929   2 Sheets-Sheet 1
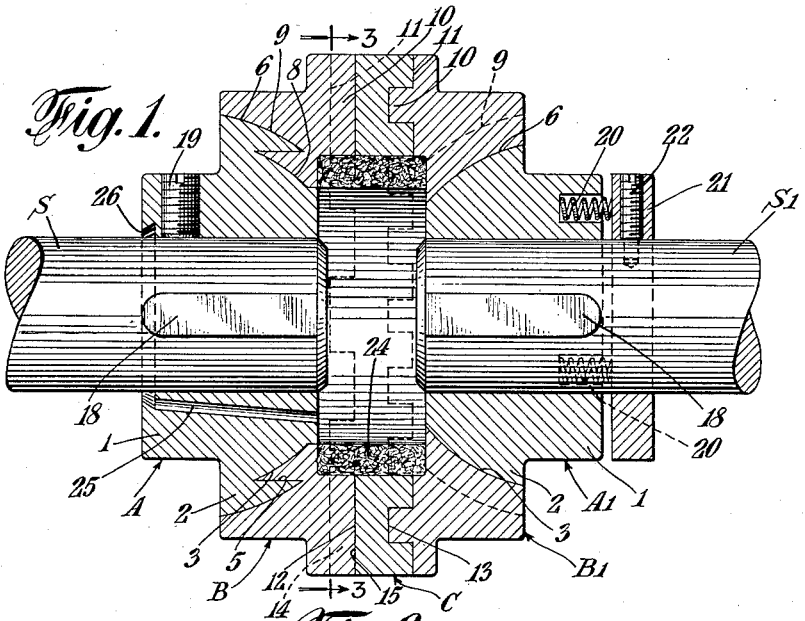
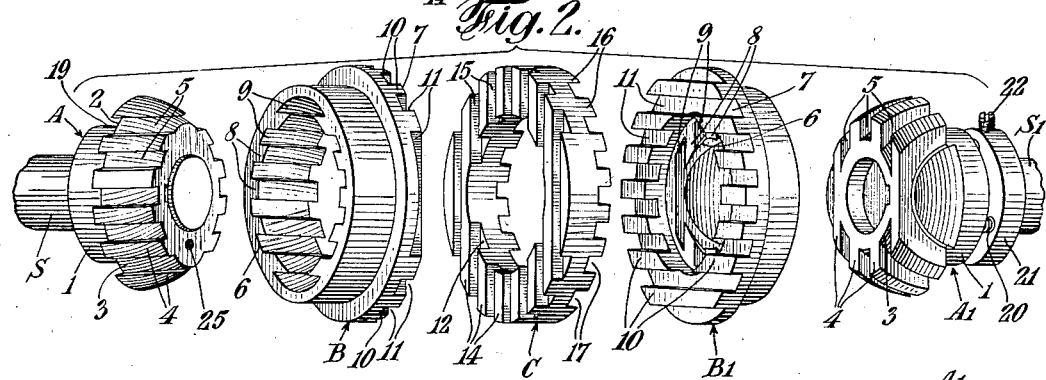
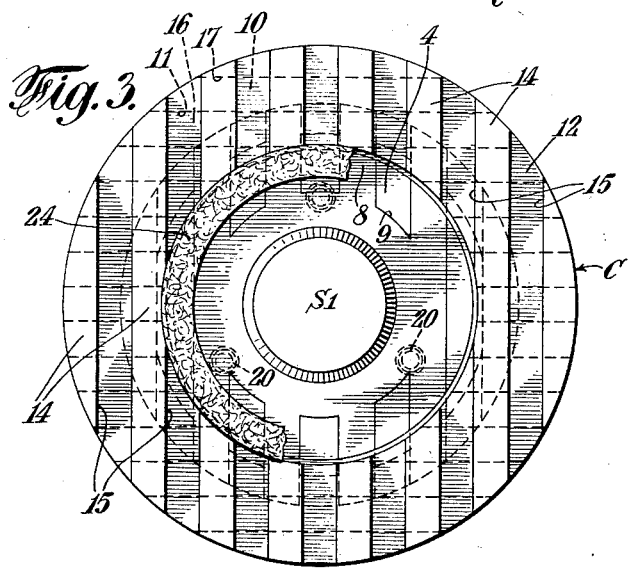
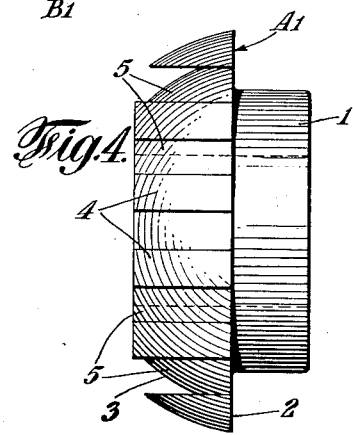
INVENTOR
Otto K. Haselau.
BY Ward, Crosby & Neal
ATTORNEYS Aug. 13, 1935. O. K. HASELAU 2,011,147
SHAFT CONNECTING MECHANISM
Original Filed April 18, 1929 2 Sheets-Sheet 2
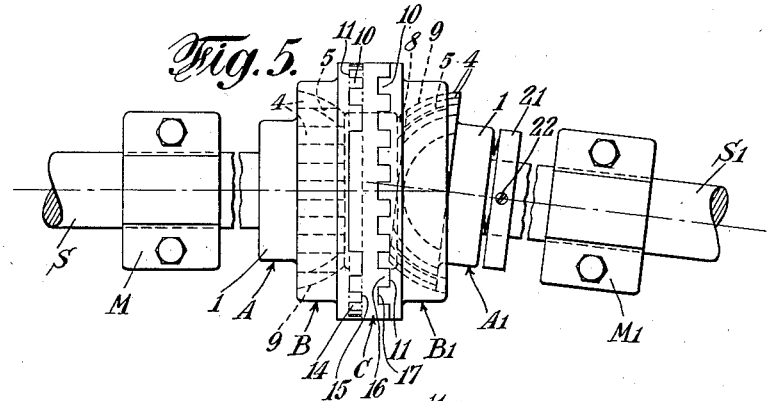
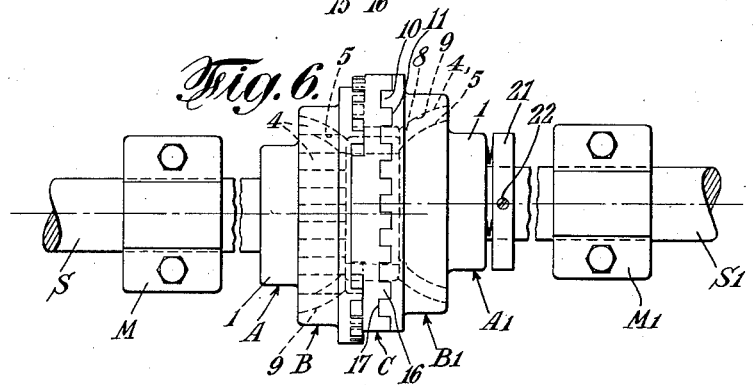
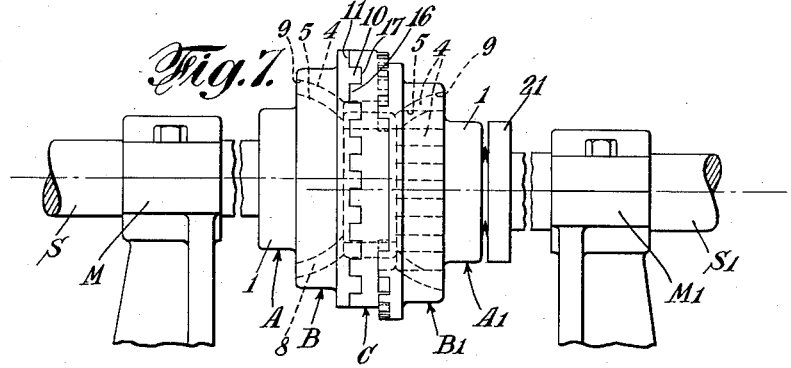
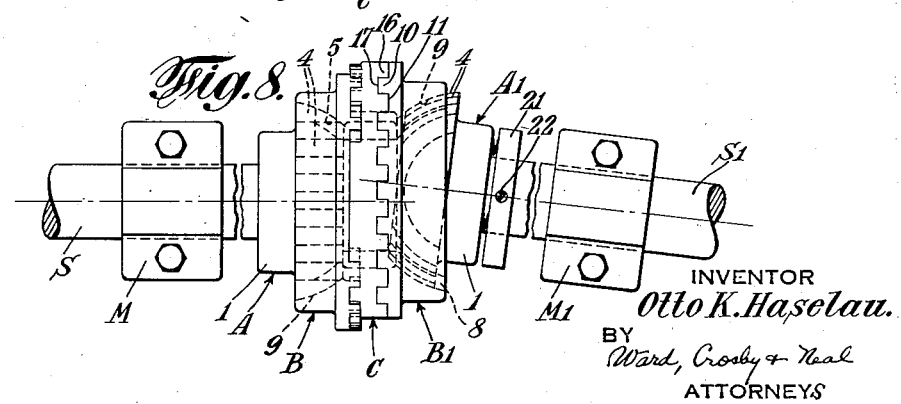
INVENTOR
Otto K. Haselau.
BY
Ward, Crosby & Neal
ATTORNEYS Patented Aug. 13, 1935

2,011,147

UNITED STATES PATENT OFFICE 2,011,147

SHAFT CONNECTING MECHANISM

Otto K. Haselau, New York, N. Y.

Application April 18, 1929, Serial No. 356,001
Renewed January 8, 1935

7 Claims. (Cl. 64—91)

My invention relates to apparatus for connecting shafts disposed in spaced end-to-end relation.

My invention relates to a device or apparatus embodying or comprising a plurality of members movably or slidably related to each other.

My invention relates to a device or apparatus utilizable for connecting ends of spaced shafts, said device or apparatus comprising parts so related as to efficiently deliver power from one shaft to another while diminishing or largely decreasing wear on the shaft bearings or a shearing or twisting effect on the shafts.

Further objects, advantages, and characteristics of my invention will appear from the following detailed description taken in connection with the accompanying drawings showing by way of example only one form of my apparatus, device or coupling mechanism.

My invention resides in the apparatus, device, and features of construction of the character hereinafter described and claimed.

For an illustration of one of the forms my apparatus, mechanism or device may take and for an illustration of typical shaft installations, reference is to be had to the accompanying drawings, in which:

Figure 1 is a vertical sectional view, partly in elevation, of a coupling device, apparatus or mechanism constructed in accordance with my invention;

Fig. 2 is a perspective exploded view of a coupling device, apparatus or mechanism;

Fig. 3 is a transverse vertical sectional view, partly in elevation, and is taken on the line 3—3 of Fig. 1 looking in the direction of the arrows;

Fig. 4 is a side elevation view of one member comprised in my coupling device, apparatus or mechanism;

Figs. 5, 6 and 8 are plan views of shaft installations comprising shafts disposed in end-to-end relation and connected by my coupling device, apparatus or mechanism, said shafts being differently related in the respective views as hereinafter described;

Fig. 7 is an elevational view of a shaft installation comprising shafts disposed in end-to-end relation and connected by my coupling device, apparatus or mechanism, the respective shaft axes being displaced as hereinafter described.

Referring to Figs. 1, 2, 3 and 4, S and S1 are rotatable members or shafts disposed in end-to-end relation and spaced one from the other. In accordance with my invention, a novel device, mechanism or structure is utilized or provided for transferring or transmitting the rotary motion of one shaft to the other.

To this end, shafts S and S1 carry, respectively, the members A and A1 which should be duplicates of each other except in a detailed manner, as hereinafter described. As shown, member A is carried by shaft S and member A1 by shaft S1.

Each of the members A and A1 comprises a hub section 1 merging into an enlarged section 2 having a convex face or surface 3 defining the surface of a part of a sphere. Projecting from each convex surface 3 of the members A and A1 are a plurality of members or ribs 4 defining, with said surface 3, spaces or channels 5.

Coacting with each of the members A and A1 are the respective members B and B1 which should be duplicates of each other. One face or surface 6 of each member B and B1 should be convex for snug engagement with the concave face or surface 3 of a member A or A1 as the case may be. The surface 7, opposite the aforesaid surface 6, of each member B and B1 should be plane.

Projecting from each convex surface 6 of the members B and B1 are a plurality of members or ribs 8 defining, with said surface 6, spaces or channels 9. Projecting from each plane surface 7 of the members B and B1 are a plurality of members or ribs 10 defining, with said surface 7, spaces or channels 11. As illustrated, the ribs 8 and channels 9 are disposed substantially at right angles with respect to the ribs 10 and channels 11.

Coacting with the members B and B1 is a single member C having plane faces or surfaces 12 and 13 on opposite sides thereof. Projecting from the plane surface 12 of member C are a plurality of members or ribs 14 defining, with said surface 12, spaces or channels 15. Projecting from the plane surface 13 of member C are a plurality of members or ribs 16 defining, with said surface 13, spaces or channels 17. As illustrated, the ribs 14 and channels 15 are disposed substantially at right angles with respect to the ribs 16 and channels 17.

Ordinarily and preferably, all of the aforesaid ribs and channels should be of the same cross-sectional configurations. At any rate, this relation should hold between the ribs 4 and channels 5 of the members A, A1 and the ribs 8 and channels 9 of members B, B1; the same relation should also hold between the ribs 10 and channels 11 of members B, B1 and the ribs 14, 16 and channels 15, 17 of member C.

As illustrated particularly in Fig. 1, each of the shafts S and S1 comprises one or more keys or lugs 18 coacting with the respective members A and A1 to prevent rotation thereof with respect to their respective shafts. Member A, for example, is restrained in any suitable manner, as by a screw 19, from moving longitudinally of its shaft S; member A1, however, ordinarily is not thus restrained from longitudinal movement with respect to its shaft S1. On the other hand, member A1, usually, is suitably biased from right to left, Fig. 1. To this end, any suitable arrangement may be utilized such, for example, as illustrated in Fig. 1 where a plurality of helical springs 20 are shown as interposed between the member A1 and a collar 21 suitably fixed to the shaft S1, as by a screw 22.

The various parts, in their assembled relation, are well illustrated in Fig. 1 wherein the shafts S and S1 are received by the openings provided therefor in the respective members A and A1.

The ribs 4 of the member A are received by the respective channels 9 of member B while the ribs 8 of the latter are received by the respective channels 5 of said member A.

The ribs 10 of the member B are received by the respective channels 15 of member C while the ribs 14 of the latter are received by the respective channels 11 of said member B.

The ribs 16 of the member C are received by the respective channels 11 of member B1 while the ribs 10 of the latter are received by the respective channels 17 of said member C.

The ribs 8 of the member B1 are received by the respective channels 5 of member A1 while the ribs 4 of the latter are received by the respective channels 9 of said member B1.

Since the ribs 14 on one side of the member C are disposed at right angles with respect to the ribs 16 on the other side thereof, it results that the members B and B1, when positioned as illustrated in Figs. 1 and 2, are so disposed that the ribs 8 of member B are horizontal while the ribs 8 of member B1 are vertical. Accordingly, the member B is movable in a horizontal direction with respect to member A while, for the same position of the parts, member B1 is movable in a vertical direction with respect to member A1.

When the axes of the shafts S and S1 are in alinement and stationary, one position of the various members A, B, C, B1 and A1 is as illustrated in Fig. 1 and by and through them, rotary motion is transmitted from one shaft to the other.

Under some circumstances, it may happen for some reason or another, that the bearing members M, M1 for the respective shafts S and S1 cause the axes of the latter to be out of alinement in the sense that extensions of the respective axes meet in angular relation all as indicated in an exaggerated manner in Fig. 5. When this is the case and in accordance with my invention, relative movement, during rotation of the shafts S and S1, occurs between the members A1 and B1 on the one hand and between the members A and B on the other hand; however, in this case there is little or no relative movement of the members B, C and B1 with respect to each other. With the parts positioned as illustrated in Fig. 5, the ribs 4 and channels 5 of member A1 are parallel with the plane of the paper and the ribs 4 and channels 5 of member A are perpendicular to said plane. At this time, the member B1 is at its limit of movement in one direction with respect to the member A1 whereas the members B and A are symmetrical in the sense that the member B is midway of its path of movement with respect to the member A. As the shaft structure rotates, the shafts S and S1, of course, retain the angular relation imposed thereon by the bearings and, as a result, member B1 moves with respect to member A1 and member B moves with respect to member A. When the shaft structure has moved 90 degrees beyond the position illustrated in Fig. 5, member B1 has become symmetrical with respect to member A1 in the sense that said member B1 is midway of its path of movement with respect to the member A. At this time, member B is at its limit of movement in one direction with respect to the member A. In this, the 90 degree position, the ribs 4 and channels 5 of member A are parallel to the plane of the paper and the ribs 4 and channels 5 of member A1 are perpendicular to the plane of the paper. When the shaft structure has rotated 180 degrees beyond the position illustrated in Fig. 5, member B1 is at its limit of movement in its other direction with respect to the member A1 whereas the members B and A are again symmetrical. When the shaft structure has rotated 270 degree beyond the position illustrated in Fig. 5, members B1 and A1 are again symmetrical whereas the member B is at its limit of movement in its other direction with respect to the member A. Obviously, in the 360 degree position of the shaft structure, the parts are related as illustrated in Fig. 5.

Thus, in accordance with my invention and with the condition illustrated in Fig. 5, rotative movement is imparted by one shaft to the other through members that are in surface-to-surface contact, the surfaces being of substantial area and sliding on and with respect to each other to effect the transmission of energy from one shaft to the other without the imposition of unwarranted strain on any of the connecting members. Moreover, and this is highly important, a coupling or connecting device constructed in accordance with my invention relieves the bearings of unwarranted wearing effects when the shafts are angularly related, for example, as illustrated in Fig. 5. Moreover, with my coupling or connecting device, the shafts, even though angularly related, are relieved of undue strain or shearing tendencies such as are imposed by the coupling devices of the prior art.

Where the angular relation of the shafts S and S1 is the sole condition for which provision is to be made, the member C may be omitted and the members B and B1 integrally formed or connected together. However, it seldom happens that the shaft axes are not displaced with respect to each other to some extent at least and, hence, the provision of the member C is desirable.

Referring to Fig. 6, the shafts S and S1 are shown non-angularly related but slightly displaced in a horizontal direction; in other words, the respective shaft axes are disposed in parallel, non-intersecting relation. Under such circumstances, little or no relative movement occurs between the members A and B on the one hand and A1 and B1 on the other hand; however, there is relative sliding movement of the members B, C and B1 with respect to each other. With the parts positioned as illustrated in Fig. 6, the ribs 14 and channels 15 of member C are parallel with the plane of the paper and the ribs 16 and channels 17 thereof are perpendicular to said plane. As the shaft structure rotates, the shafts S and S1, of course, retain the relation imposed thereon by the bearings. Under the conditions recited, members B and B1, in effect, constitute extensions of the respective shafts and rotate concentrically therewith. Accordingly, member C moves with respect to the members B and B1. With the shaft structure in the position illustrated in Fig. 6, member C is at its limit of movement in one direction with respect to the member B and is symmetrical with respect to the member B1 in the sense that it is midway of its path of movement with respect thereto. As the shaft structure rotates from the position illustrated in Fig. 6, member C slides with respect to both of the members B and B1 and, when it has moved 90 degrees beyond the position illustrated in Fig. 6, said member C has become symmetrical with respect to the member B in the sense that it is midway of its path of movement with respect thereto; at this time, member C has moved to one end of its path of movement with respect to the member B1. In this, the 90 degree position, the ribs 14 and channels 15 are perpendicular to the plane of the paper and the ribs 16 and channels 17 are parallel to said plane. When the shaft structure has rotated 180 degrees beyond the position illustrated in Fig. 6, member C is at its limit of movement in the reverse direction with respect to member B and has again become symmetrical, as aforesaid, with respect to member B1. Again, when the shaft structure has rotated 270 degrees beyond the position illustrated in Fig. 6, member C has become symmetrical, as aforesaid, with respect to the member B and is at its limit of movement in the reverse direction with respect to member B1. Obviously, in the 360 degree position of the shaft structure, the parts are related as illustrated in Fig. 6.

Referring to Fig. 7, the shafts S and S1 are shown as non-angularly related but slightly displaced in a vertical direction. In other words, the respective shaft axes are displaced in the same sense as shown in Fig. 6; that is, they are disposed in parallel, non-intersecting relation. With the arrangement illustrated in Fig. 7, movement of member C with respect to the members B and B1 occurs in identically the same manner as described in detail above with respect to Fig. 6, hence the description heretofore given in connection with Fig. 6 will suffice for a description of the operation of the arrangement shown in Fig. 7.

Obviously, the displacement of the shaft axes as illustrated horizontally in Fig. 6 and vertically in Fig. 7 are examples merely of axis displacements which might occur in any plane.

Referring to Fig. 8, there is illustrated in an exaggerated manner the condition usually and ordinarily met in practice. The arrangement shown in Fig. 8 involves the condition illustrated in Fig. 5 when combined, for example, with the condition illustrated in either of Figs. 6 or 7. In other words, in Fig. 8, the shafts S and S1 are angularly related and, at the same time their axes are so disposed that extensions of their respective axes do not and cannot meet. Obviously, in the construction illustrated in Fig. 8, there occurs relative movement of the members B and B1, with respect to the respective members A and A1; simultaneously, there occurs relative movement of the member C with respect to the members B and B1. The relative movement first named cares for the condition arising because of the angular relation of the shafts while the relative movement last named cares for the condition arising because of the displacement of the shaft axes relative to each other so that extensions thereof are in non-intersecting relation.

As hereinbefore described one of the members A or A1, herein illustrated as the latter, is slidable on its shaft and biased toward the other shaft. Due to this condition, the various members A, B, C, B1 and A1 are maintained closely adjacent and in contact with each other and this relation continues indefinitely despite wear of the parts, the springs 20, or equivalent, functioning to take up lost motion.

Where parts or members are slidably related as are the herein described members A, B, etc., it is desirable that adjacent members be formed of dissimilar metallic materials. Accordingly and in a preferred form of my invention, the members A, C and A1 are formed of iron or steel, while the members B and B1 are formed of bronze. However, if desired, any other suitable combination of metals or other materials may be employed.

As a satisfactory arrangement for oiling or lubricating the bearing or sliding surfaces of mechanism constructed in accordance with my invention, all of members A, B, etc. may be similarly perforated substantially as illustrated, the various perforations being substantially in alinement after the respective members A, B, etc. have been assembled on axially alined shafts. Disposed within the space thus formed is a suitable washer or member 24 of felt, loose fabric, or the like. The member A may be provided with or comprise passages 25 communicating with the aforesaid space, the hub section 1 of member A being cut away to form a channel 26 communicating with the respective passages 25.

Accordingly, with a structure of the character illustrated, suitable lubricant, as liquid oil may be suitably introduced into the channel 26, as from the spout or nozzle of an oil can during rotation of the shaft structure. Under the influence of centrifugal action, the lubricant travels along the passages 25 and, in the space in which said passages 25 terminate, is passed, by centrifugal action, into engagement with the member 24 which absorbs the same. The latter acts somewhat as a reservoir to regulate and feed the lubricant outwardly, under the influence of centrifugal action, while the shaft structure rotates, to and through the various slidably related parts of the members A, B, etc.

From the foregoing it will appear that a coupling device constructed in accordance with my invention is of such character that power is delivered or transmitted from one shaft to another without bending, springing or stretching of the essential parts or members. Furthermore and as described, my coupling device operates equally and with entire satisfaction no matter if the shafts are angularly related or if they are horizontally, vertically or intermediately displaced.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. Shaft coupling mechanism comprising spaced members having convex surfaces, respectively, and disposed in facing relation, spaced members each having a concave surface slidably engaging one of said convex surfaces, and a member between and having linear surfaces slidable, respectively, on linear surfaces of said second named spaced members, said surfaces comprising alternate ribs and channels, the channels of one surface receiving the ribs of an adjacent surface.

2. Coupling mechanism for shafts disposed in end-to-end relation, said mechanism comprising a plurality of members disposed in side-by-side relation and slidable with respect to each other, one pair of said members engaging each other along surfaces arranged in convex-concave relation, another pair of said members being movable with respect to each other in linear relation.

3. Coupling mechanism for shafts disposed in end-to-end relation, said mechanism comprising first and second members slidable with respect to each other along surfaces arranged in convex-concave relation, one of said members being carried by one of said shafts, a third member rotatably secured to the other of said shafts, and a fourth member interposed between and connecting one of said first named members to said third member, said fourth member being slidable in one direction on said one of said members and at right angles to said one direction on said third member.

4. In coupling mechanism for shafts disposed in end-to-end relation, means for connecting said shafts for rotation in unison, said means comprising a member having an arcuate surface on which is movable another member partaking of movement with respect to one of said shafts, said means further comprising another member movable along a path defined by a plane disposed substantially at right angles with respect to the longitudinal axis of one of said shafts, both of said members being movable with respect to both of said shafts, and said members being movable with respect to each other.

5. Shaft coupling mechanism comprising members adapted for engagement, respectively, with shaft ends, and a plurality of relatively slidable members connected directly to each other and intervening between said first named members, one of said slidable members being movable along an arcuate surface formed on one of said members, another of said members being movable along a path defined by a plane disposed transversely of the shafts, and said members being movable with respect to each other.

6. Shaft coupling mechanism comprising members adapted for engagement, respectively, with shaft ends, and a plurality of relatively slidable members connected directly to each other and intervening between said first named members, one of said slidable members being movable along an arcuate surface formed on one of said members, another of said members being movable along a path defined by a plane disposed substantially at right angles with respect to said first named path, and said members being movable with respect to each other.

7. Shaft coupling mechanism comprising members adapted for engagement, respectively, with shaft ends, and a plurality of relatively slidable members intervening between said first named members, one of said slidable members being movable along an arcuate surface formed on one of said members, another of said members being movable along a path defined by a plane disposed transversely of the shafts, and said members being movable with respect to each other.

OTTO K. HASELAU.